(12) United States Patent
Kishimoto et al.

(10) Patent No.: US 12,265,420 B2
(45) Date of Patent: Apr. 1, 2025

(54) DISPLAY DEVICE

(71) Applicant: Samsung Display Co., Ltd., Yongin-si (KR)

(72) Inventors: Hirotsugu Kishimoto, Hwaseong-si (KR); Yongchan Jeon, Cheonan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 265 days.

(21) Appl. No.: 18/093,534

(22) Filed: Jan. 5, 2023

(65) Prior Publication Data

US 2023/0288956 A1 Sep. 14, 2023

(30) Foreign Application Priority Data

Mar. 10, 2022 (KR) .................. 10-2022-0030124

(51) Int. Cl.
 *G06F 1/16* (2006.01)
(52) U.S. Cl.
 CPC .......... *G06F 1/1616* (2013.01); *G06F 1/1652* (2013.01); *G06F 1/1656* (2013.01)
(58) Field of Classification Search
 CPC .................................................. G06F 1/1652
 See application file for complete search history.

(56) References Cited

U.S. PATENT DOCUMENTS

| | | | | |
|---|---|---|---|---|
| 9,506,279 B2* | 11/2016 | Kauhaniemi | ....... | H04M 1/0268 |
| 10,433,438 B2* | 10/2019 | Moon | .................. | H05K 5/0017 |
| 10,694,623 B2* | 6/2020 | Park | ...................... | H05K 5/0226 |
| 10,736,225 B2* | 8/2020 | Choi | ...................... | G06F 1/1681 |
| 10,809,552 B2* | 10/2020 | Park | .......................... | G02F 1/13 |
| 10,945,346 B2* | 3/2021 | Moon | .................. | H05K 5/0017 |
| 11,453,193 B2* | 9/2022 | Cosgrove | ................ | G09F 9/301 |
| 12,007,805 B2* | 6/2024 | Liu | ........................ | G06F 1/1616 |
| 2015/0055287 A1* | 2/2015 | Seo | ........................ | G06F 1/1681 |
| | | | | 361/679.27 |
| 2020/0004295 A1 | 1/2020 | Paek et al. | | |
| 2022/0057834 A1* | 2/2022 | Jang | ....................... | G06F 1/1616 |

FOREIGN PATENT DOCUMENTS

| | | |
|---|---|---|
| CN | 207603695 U | 7/2018 |
| KR | 1020200002576 A | 1/2020 |
| KR | 1020210078242 A | 6/2021 |

* cited by examiner

*Primary Examiner* — Adrian S Wilson
(74) *Attorney, Agent, or Firm* — CANTOR COLBURN LLP

(57) ABSTRACT

A display device includes a folding area and a non-folding area divided into a first non-folding area and a second non-folding area spaced apart in a first direction with the folding area therebetween. The display device includes a display module, a window on a first surface of the display module, and a support plate on a second surface of the display module. At least one of the window and the support plate includes a folding part corresponding to the folding area and including a plurality of first sub film layers stacked in the first direction, and a non-folding part corresponding to the non-folding area and including second sub film layers stacked in the first direction. A second sub film layer of the second sub film layers has a storage modulus larger than a storage modulus of a first sub film layer of the plurality of first sub film layers.

20 Claims, 13 Drawing Sheets

DISPLAY DEVICE

This application claims priority to Korean Patent Application No. 10-2022-0030124, filed on Mar. 10, 2022, and all the benefits accruing therefrom under 35 U.S.C. § 119, the content of which in its entirety is herein incorporated by reference.

BACKGROUND

1. Field

The disclosure relates to a display device, and more particularly, to a display device including a folding area.

2. Description of the Related Art

Various display devices used in multimedia devices such as televisions, mobile phones, tablet computers, navigation devices, and game machines are being developed. In particular, recently, in order to facilitate portability and improve user convenience, a display device having a flexible display member that may be bent and capable of being folded or rolled is being developed.

For such a flexible display device, display device members such as a window for protecting the display module or a support member for supporting the display module without compromising the folding or bending motion are desired, and accordingly, it is desired to develop display device members having excellent folding characteristics without deteriorating mechanical properties.

SUMMARY

The disclosure provides a display device having excellent folding characteristics and improved impact resistance against external impact.

An embodiment of the inventive concept provides a display device including a folding area and a non-folding area divided into a first non-folding area and a second non-folding area spaced apart in a first direction with the folding area therebetween. The display device includes a display module, a window disposed on a first surface of the display module, and a support plate disposed on a second surface of the display module opposite to the first surface of the display module. At least one of the window and the support plate includes a folding part corresponding to the folding area and including first sub film layers stacked in the first direction, and a non-folding part corresponding to the non-folding area and including second sub film layers stacked in the first direction. A second sub film layer of the second sub film layers has a storage modulus larger than a storage modulus of a first sub film layer of the first sub film layers.

In an embodiment, the folding part further may include at least one second sub film layer stacked in the first direction adjacent to the first sub film layers.

In an embodiment, the storage modulus of each of the plurality of first sub film layers may be about 1 megapascal (MPa) or less. The storage modulus of each of the plurality of second sub film layers may be about 3 MPa or more.

In an embodiment, each of the first sub film layers may include at least one of silicone, acrylic, thermoplastic polyurethane, and ethylene vinyl acetate.

In an embodiment, each of the second sub film layers may include at least one of silicone, acrylic, polyethylene terephthalate, polyethylene naphthalate, polyethersulfone, and polyimide.

In an embodiment, a difference between a refractive index of the first sub film layer and a refractive index of the second sub film layer in a visible region may be about 0.02 or less.

In an embodiment, a thickness of the first sub film layers and the second sub film layers may be each independently about 100 micrometers (μm) or more and about 200 μm or less. The thickness may be a length in a direction perpendicular to an interface between neighboring sub film layers of the plurality of first sub film layers and the plurality of second sub film layers.

In an embodiment, a thickness of the window and the support plate may be each independently about 50 μm or more and about 300 μm or less.

In an embodiment, an interface between the first sub film layers and an interface between the second sub film layers may be perpendicular or inclined with respect to an upper surface or a lower surface of the display module.

In an embodiment of the inventive concept, a display device may include a display module, an upper module disposed on a first surface of the display module, and a lower module disposed on a second surface of the display module opposite to the first surface of the display module. At least one of the upper module and the lower module includes a composite film layer including a plurality of sub film layers sequentially stacked in a first direction. An interface between adjacent sub film layers of the plurality of sub film layers is perpendicular to or inclined with respect to the first surface or the second surface of the display module.

In an embodiment, the plurality of sub film layers of the composite film layer may include a plurality of first sub film layers, and a second sub film layer of the plurality of second sub film layers may have a storage modulus larger than a storage modulus of a first sub film layer of the plurality of first sub film layers.

In an embodiment, the storage modulus of each of the plurality of first sub film layers may be about 1 MPa or less. The storage modulus of each of the plurality of second sub film layers may be about 3 MPa or more.

In an embodiment, each of the plurality of first sub film layers may include at least one of silicone, acrylic, thermoplastic polyurethane, and ethylene vinyl acetate. Each of the plurality of second sub film layers may include at least one of silicone, acrylic, polyethylene terephthalate, polyethylene naphthalate, polyethersulfone, and polyimide.

In an embodiment, a difference between a refractive index of the first sub film layer and a refractive index of the second sub film layer in a visible region may be about 0.02 or less.

In an embodiment, the display module may include a folding display part and a non-folding display part adjacent to the folding display part adjacent in the first direction. The upper module may include a window including a window folding part corresponding to the folding display part, and a window non-folding part corresponding to the non-folding display part. The lower module may include a support plate including a folding support part corresponding to the folding display part, and a non-folding support part corresponding to the non-folding display part. At least one of the window and the support plate may be the composite film layer.

In an embodiment, the window folding part may include at least one of the plurality of first sub film layers stacked in the first direction, wherein the window non-folding part may include at least one of the plurality of second sub film layers stacked in the first direction.

In an embodiment, the window folding part may further include at least one of the plurality of second sub film layers, wherein the window non-folding part may not include the first sub film layer.

In an embodiment, the folding support part may include at least one of the plurality of first sub film layers stacked in the first direction, wherein the non-folding support part may include at least one of the plurality of second sub film layers stacked in the first direction.

In an embodiment, the folding support part may further include at least one of the plurality of second sub film layers, wherein the non-folding support part may not include the first sub film layer.

In an embodiment, a thickness of the plurality of sub film layers may be each independently about 100 μm or more and about 200 μm or less, wherein the thickness may be a length in a direction perpendicular to the interface between the adjacent sub film layers.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1A:
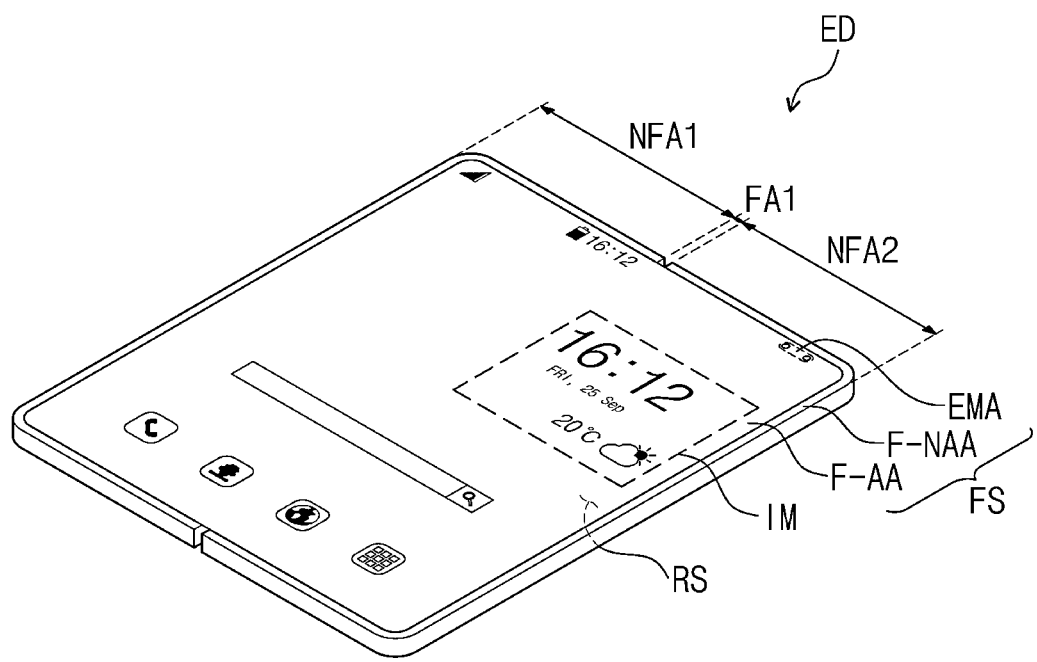
FIG. 1A is a perspective view illustrating an embodiment of an unfolded state of a display device.
Figure 1A:
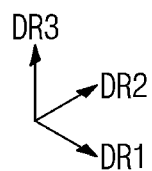

Since the inventive concept may have various changes and may have various forms, specific embodiments are illustrated in the drawings and described in detail in the text. However, this is not intended to limit the inventive concept to specific embodiments, and should be understood to include all modifications, equivalents and substitutes included in the spirit and scope of the inventive concept.

In this specification, when an element (or region, layer, part, etc.) is referred to as being "on", "connected to", or "coupled to" another element, it means that it may be directly placed on/connected to/coupled to other components, or a third component may be arranged between them.

In the specification, "directly disposed" may mean that there is no layer, film, region, plate, and the like added between a portion such as a layer, film, region, or plate and another portion. For example, "directly disposed" may mean disposing between two layers or two members without using an additional member such as an adhesive member.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the inventive concept. The terms of a singular form may include plural forms unless otherwise specified.

In addition, terms such as "below", "the lower side", "on", and "the upper side" are used to describe a relationship of components shown in the drawing. The terms are described as a relative concept based on a direction shown in the drawing. In the specification, "disposed on" may refer to a case of being disposed not only on the upper part of any one member but also on the lower part.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this inventive concept belongs. In addition, terms such as terms defined in commonly used dictionaries should be interpreted as having a meaning consistent with the meaning in the context of the related technology, and it should not be construed in an overly ideal or overly formal sense unless explicitly defined here.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Hereinafter, a window in an embodiment of the inventive concept and a display device in an embodiment will be described with reference to the drawings.

Figure 1B:
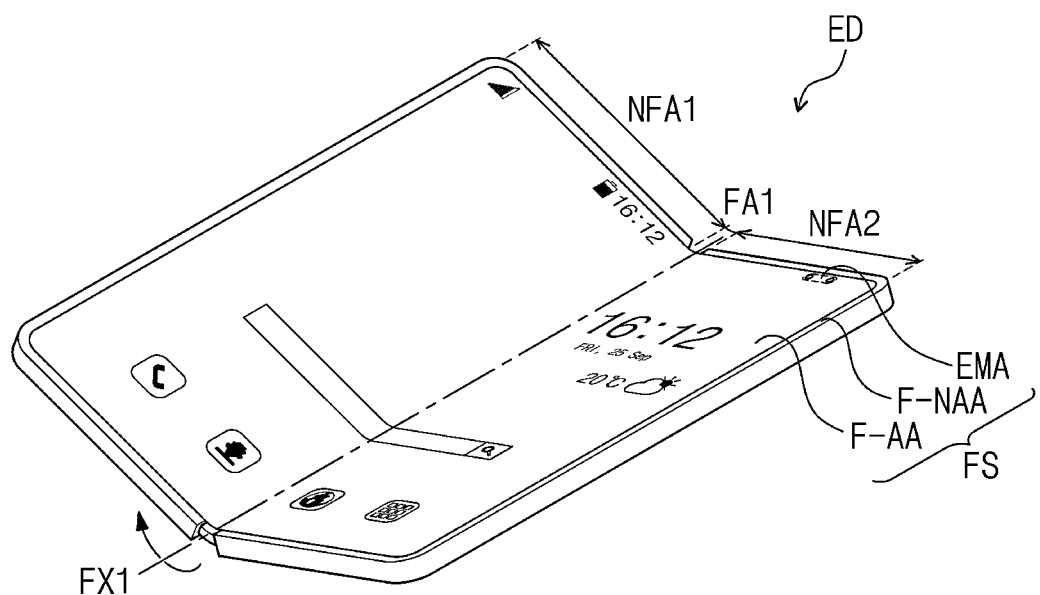
FIG. 1B is a perspective view illustrating an embodiment of an in-folding process of the display device illustrated in FIG. 1A.
Figure 1B:
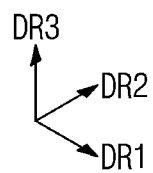
Figure 1C:
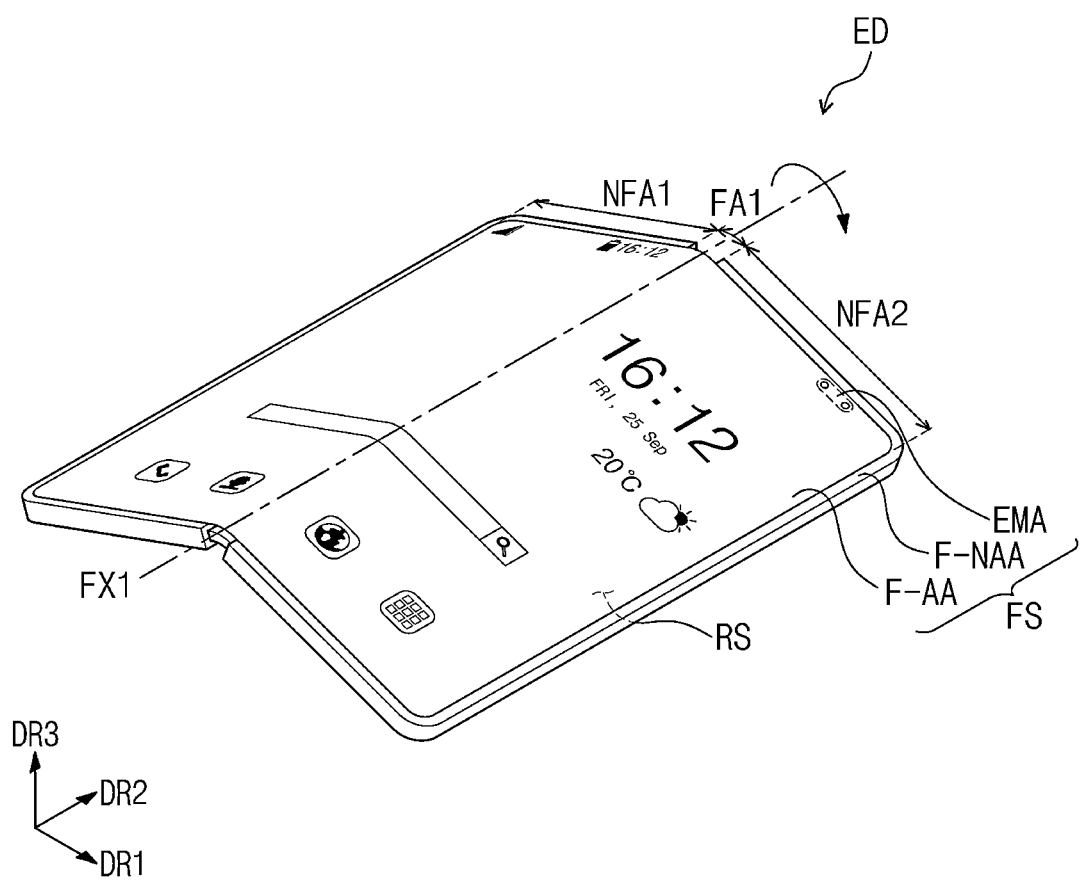
FIG. 1C is a perspective view illustrating an embodiment of an out-folding process of the display device illustrated in FIG. 1A.

FIG. 1A is a perspective view illustrating an embodiment of an unfolded state of a display device. FIG. 1B is a perspective view illustrating an in-folding process of the display device of FIG. 1A. FIG. 1C is a perspective view illustrating an out-folding process of the display device illustrated in FIG. 1A.

The display device ED in an embodiment may be a device activated according to an electrical signal. In an embodiment, the display device ED may be a mobile phone, a tablet, a car navigation system, a game machine, or a wearable device, for example, but the disclosure is not limited thereto.

In FIG. 1A of the specification, it is illustrated that the display device ED is a mobile phone.

Referring to FIGS. 1A to 1C, the display device ED in an embodiment may include a first display surface FS defined by a first direction axis DR1 and a second direction axis DR2 intersecting the first direction axis DR1. The display device ED may provide the image IM to the user through the first display surface FS. The display device ED in an embodiment may display the image IM toward the third direction axis DR3 on the first display surface FS parallel to each of the first direction axis DR1 and the second direction axis DR2. In this specification, the front surface (or upper surface) and the rear surface (or lower surface) of each component is defined based on the direction in which the image IM is displayed. The front surface and the rear surface may be opposed to each other in the third direction axis DR3, and the normal directions of the front surface and the rear surface may be parallel to the third direction axis DR3.

The display device ED in an embodiment may include a first display surface FS and a second display surface RS. The first display surface FS may include a first active area F-AA and a first peripheral area F-NAA. The first active area F-AA may include an electronic module area EMA. The second display surface RS may be defined as a surface opposite to at least a portion of the first display surface FS. That is, the second display surface RS may be defined as a part of the rear surface of the display device ED.

The display device ED in an embodiment may sense an external input applied from the outside. The external input may include various types of inputs provided from the outside of the display device ED. In an embodiment, the external input may include an external input (e.g., hovering) that is applied close to or spaced a predetermined distance from the display device ED as well as contact by a portion of a body of a user, such as a hand of the user. In addition, the external input may have various forms such as force, pressure, temperature, light, or the like.

In FIG. 1A and the following drawings, the first direction axis DR1 to the third direction axis DR3 are shown, and the directions indicated by the first to third direction axes DR1, DR2, and DR3 described herein are relative concepts and may be converted into other directions. Also, directions indicated by the first to third direction axes DR1, DR2, and DR3 may be described as the first to third directions, and the same reference numerals may be used.

The first active area F-AA of the display device ED may be an area activated according to an electrical signal. The display device ED in an embodiment may display the image IM through the first active area F-AA. In addition, various types of external inputs may be sensed in the first active area F-AA. The first peripheral area F-NAA is adjacent to the first active area F-AA. The first peripheral area F-NAA may have a predetermined color. The first peripheral area F-NAA may surround the first active area F-AA. Accordingly, the shape of the first active area F-AA may be substantially defined by the first peripheral area F-NAA. However, this is illustrated by way of example, and the first peripheral area F-NAA may be disposed adjacent to only one side of the first active area F-AA, or may be omitted. The display device ED in an embodiment may include an active area having various shapes, and is not limited to any particular embodiment.

The display device ED may include a folding area FA1 and non-folding areas NFA1 and NFA2. The display device ED may include a plurality of non-folding areas NFA1 and NFA2. In an embodiment, the non-folding areas NFA1 and NFA2 may be disposed adjacent to the folding area FA1 with the folding area FA1 therebetween. The display device ED in an embodiment may include a first non-folding area NFA1 and a second non-folding area NFA2 spaced apart from each other in the first direction axis DR1 direction with the folding area FA1 therebetween. In an embodiment, the first non-folding area NFA1 may be disposed on one side of the folding area FA1 along the first direction DR1, and the second non-folding area NFA2 may be disposed on the other side of the folding area FA1 in the first direction DR1, for example.

Although an embodiment of the display device ED including one folding area FA1 is illustrated in FIGS. 1A to 1C, the disclosure is not limited thereto, and a plurality of folding areas may be defined in the display device ED.

Referring to FIG. 1B, the display device ED in an embodiment may be folded with reference to the first folding axis FX1. The first folding axis FX1 is a virtual axis extending in the second direction axis DR2 direction, and the first folding axis FX1 may be parallel to the long side direction of the display device ED. The first folding axis FX1 may extend along the second direction axis DR2 on the first display surface FS.

The display device ED may be folded with reference to the first folding axis FX1 to be deformed into an in-folding state in which one area overlapping the first non-folding area NFA1 and the other area overlapping the second non-folding area NFA2 of the first display surface FS face each other.

In the display device ED in an embodiment, the second display surface RS may be visually recognized by a user in an in-folded state. The second display surface RS may further include an electronic module area in which electronic modules having various configurations are disposed, and is not limited to any particular embodiment.

Referring to FIG. 1C, the display device ED in an embodiment may be folded with reference to the first folding axis FX1 to be deformed into an out-folding state in which one area overlapping the first non-folding area NFA1 and another area overlapping the second non-folding area NFA2 of the second display surfaces RS face each other.

However, the disclosure is not limited thereto, and the display device ED may be folded with reference to a plurality of folding axes so that a portion of each of the first display surface FS and the second display surface RS faces each other, and the number of folding axes and the number of non-folding areas corresponding to the number of folding axes are not particularly limited.

Various electronic modules may be disposed in the electronic module area EMA. In an embodiment, the electronic module may include at least one of a camera, a speaker, a light sensor, and a thermal sensor, for example. The electronic module area EMA may detect an external object received through the first or second display surfaces FS and RS, or provide a sound signal, such as a voice, to the outside through the first or second display surface FS or RS. The electronic module may include a plurality of components, and is not limited to any particular embodiment.

The electronic module area EMA may be surrounded by the first active area F-AA and the first peripheral area F-NAA. However, the disclosure is not limited thereto, and the electronic module area EMA may be disposed in the first active area F-AA, and is not limited thereto.

Figure 2A:
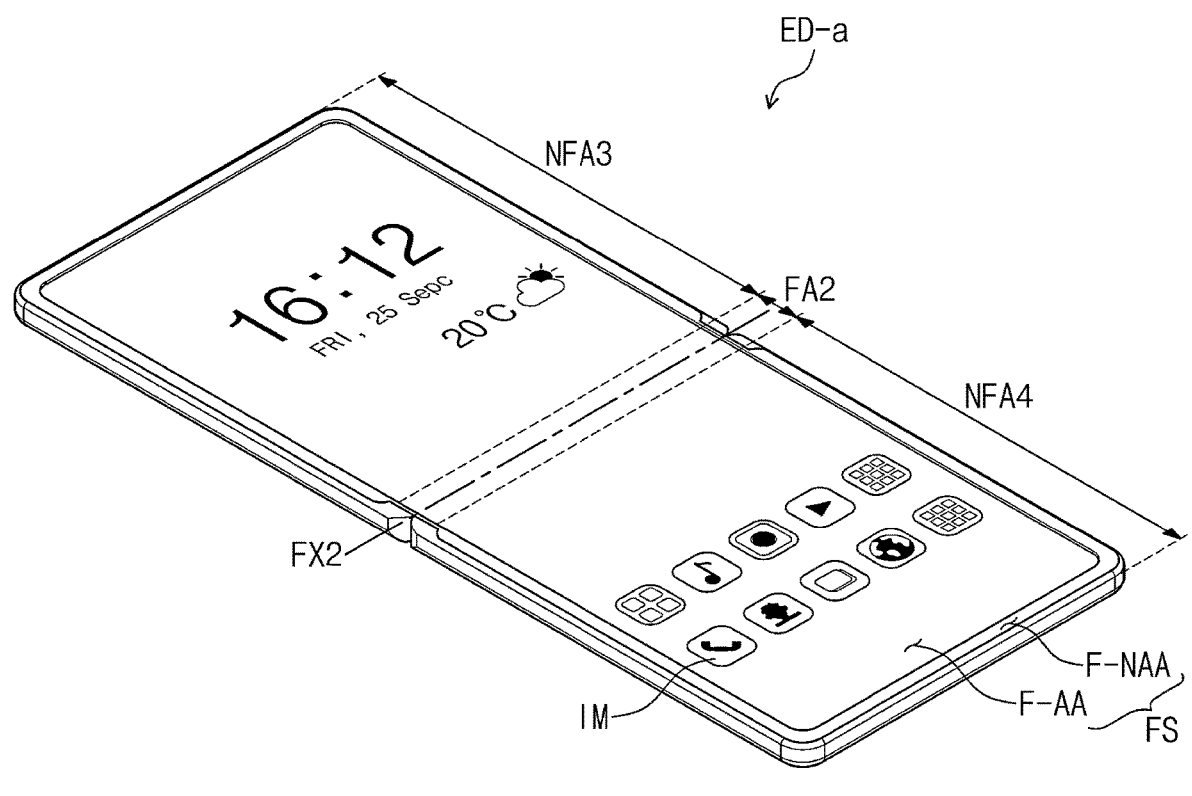
FIG. 2A is a perspective view illustrating an embodiment of an unfolded state of a display device.
Figure 2A:
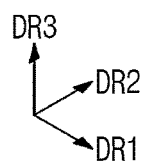
Figure 2B:
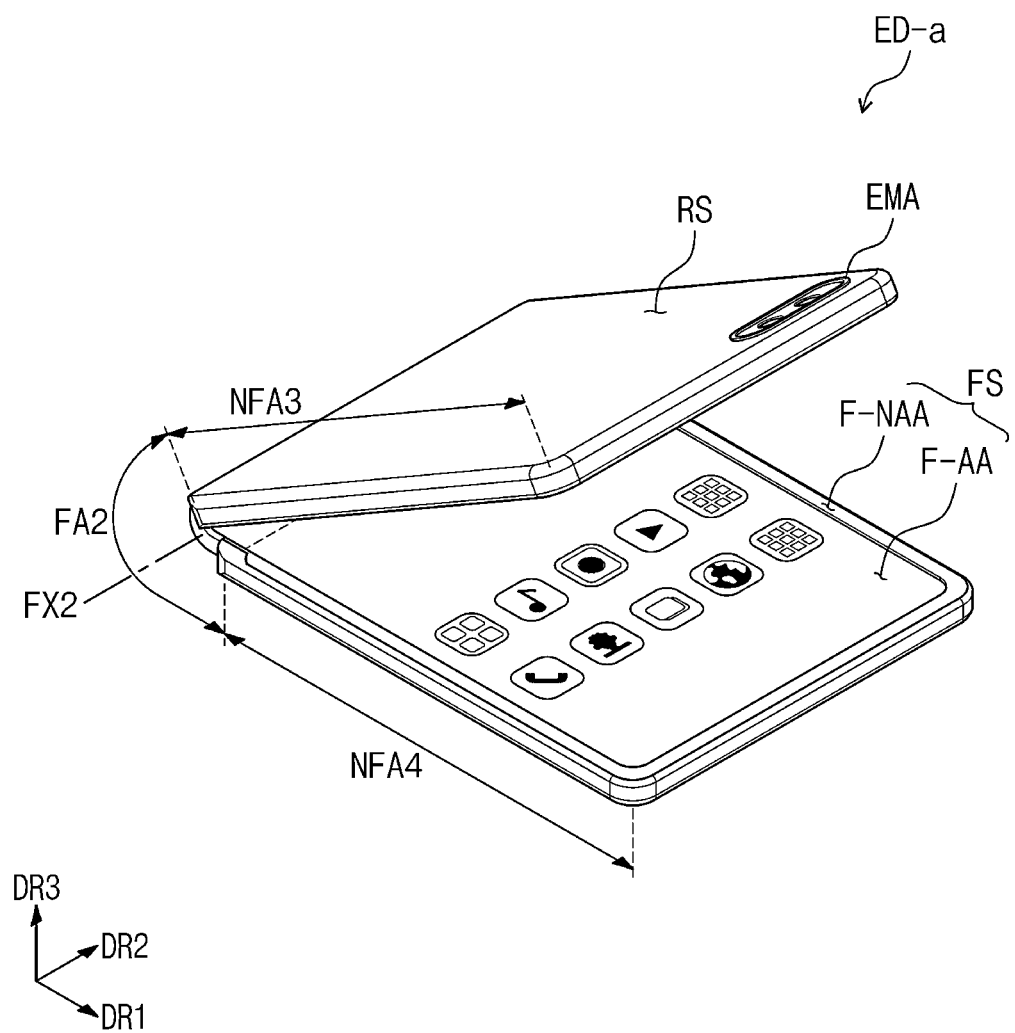
FIG. 2B is a perspective view illustrating an embodiment of an in-folding process of the display device shown in FIG. 2A.

FIG. 2A is a perspective view illustrating an embodiment of an unfolded state of a display device. FIG. 2B is a perspective view illustrating an in-folding process of the display device of FIG. 2A.

The display device ED-a in an embodiment may be folded with reference to the second folding axis FX2 extending in one direction parallel to the second direction axis DR2. FIG.

2B illustrates a case in which the extending direction of the second folding axis FX2 is parallel to the extending direction of the short side of the display device ED-a. However, the disclosure is not limited thereto.

The display device ED-a in an embodiment may include at least one folding area FA2 and non-folding areas NFA3 and NFA4 adjacent to the folding area FA2. The non-folding areas NFA3 and NFA4 may be spaced apart from each other with the folding area FA2 therebetween.

The folding area FA2 has a predetermined curvature and a radius of curvature. In an embodiment, the first non-folding area NFA3 and the second non-folding area NFA4 face each other, and the display device ED-a may be inner-folded so that the display surface FS is not exposed to the outside.

Also, unlike illustrated, in an embodiment, the display device ED-a may be outer-folded so that the display surface FS is exposed to the outside. In an embodiment, in the display device ED-a, the first display surface FS is visible to the user in the unfolded state, and the second display surface RS is visible to the user in the in-folded state. The second display surface RS may include an electronic module area EMA in which electronic modules having various configurations are disposed.

The display device ED-a in an embodiment may include a second display surface RS, and the second display surface RS may be defined as a surface facing at least a portion of the first display surface FS. In the in-folded state, the second display surface RS may be visually recognized by the user. The second display surface RS may include an electronic module area EMA in which electronic modules having various configurations are disposed. In an embodiment, an image may be provided through the second display surface RS.

In an embodiment, the display devices ED and ED-a may be configured such that an in-folding operation or an out-folding operation is repeated from an unfolding operation, but the disclosure is not limited thereto. In an embodiment, the display devices ED and ED-a may select any one of an unfolding operation, an in-folding operation, and an out-folding operation.

Figure 3:
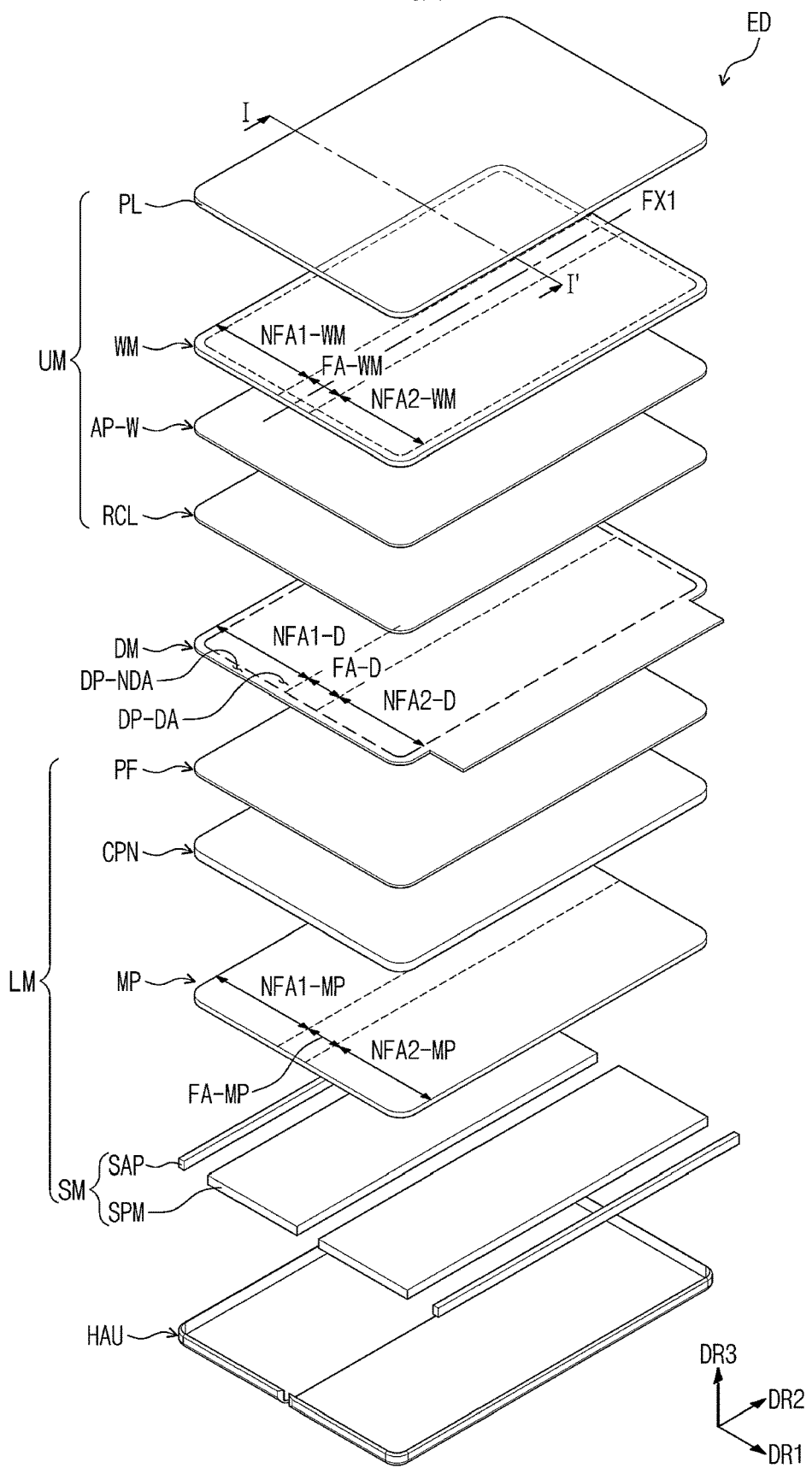
FIG. 3 is an exploded perspective view of an embodiment of a display device.
Figure 4:
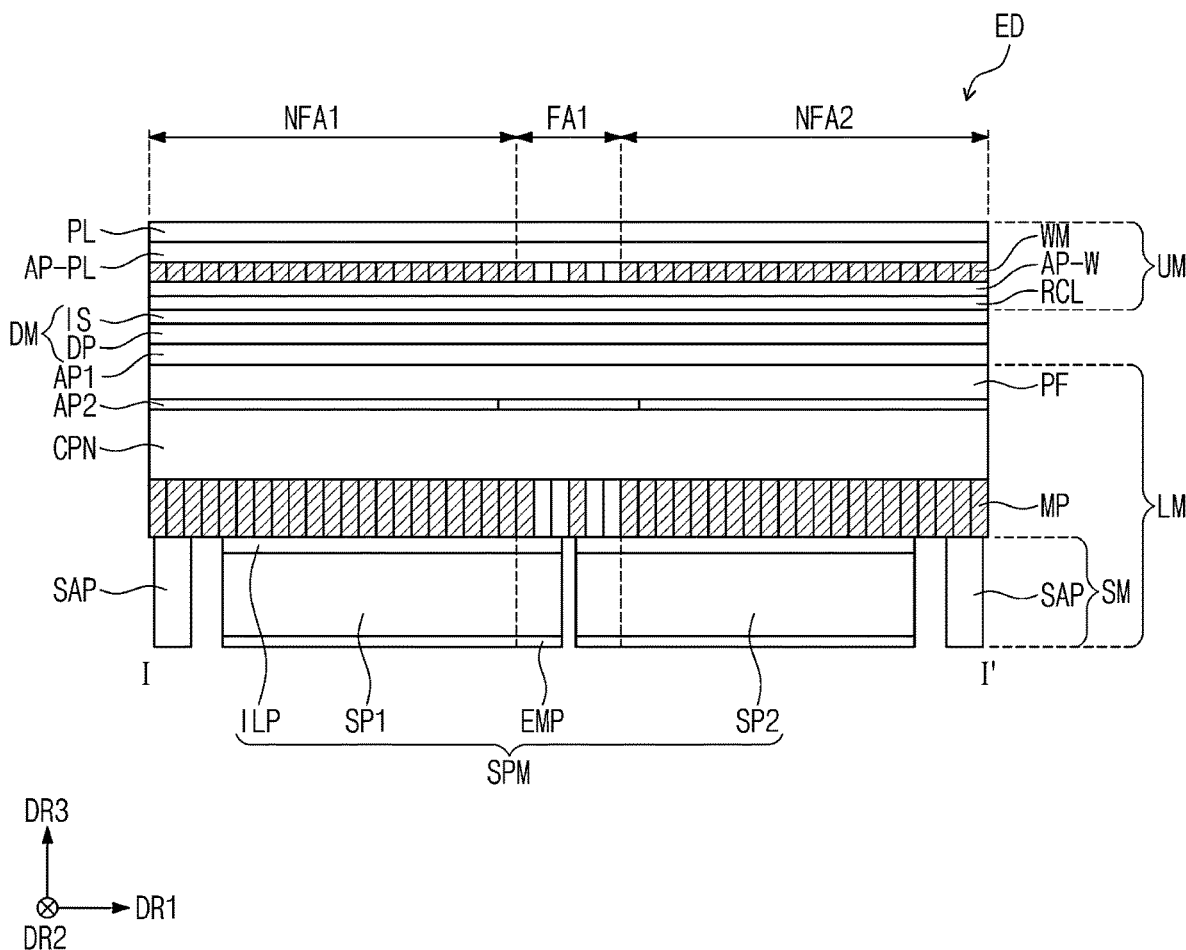
FIG. 4 is a cross-sectional view of an embodiment of a display device.

FIG. 3 is an exploded perspective view of an embodiment of a display device in an embodiment, and FIG. 4 is a cross-sectional view of an embodiment of the display device. FIG. 3 is an exploded perspective view of an embodiment of the display device shown in FIG. 1A by way of example. FIG. 4 is a cross-sectional view showing a portion corresponding to the line I-I' of FIG. 3.

Referring to FIGS. 3 and 4, a display device ED in an embodiment may include a display module DM, an upper module UM disposed above the display module DM, and a lower module LM disposed below the display module DM. The upper module UM may include a window WM disposed above the display module DM. In addition, the lower module LM may include and a support plate MP disposed below the display module DM. In this specification, the upper module UM may be also referred to as a protection member, and the lower module LM may be also referred to as a support member.

The upper module UM is disposed above the display module DM, and may function as a protective layer to protect the display module DM from external impact, or may function as an optical layer to prevent reflection by external light, or to increase light extraction efficiency.

In the display device ED in an embodiment, at least one of the upper module UM and the lower module LM may be a composite film layer including a plurality of sub film layers SF and HF (refer to FIGS. 5 and 6) sequentially stacked in the first direction DR1. In addition, the display device ED in an embodiment includes a display module DM, a window WM disposed above the display module DM, and a support plate MP disposed below the display module DM, and at least one of the window WM and the support plate MP may include a plurality of sub film layers SF and HF (refer to FIGS. 5 and 6) sequentially stacked in the first direction DR1. In an embodiment, the window WM or the support plate MP may be a composite film layer.

In an embodiment, the first direction DR1 in which the plurality of sub film layers SF and HF (refer to FIGS. 5 and 6) is stacked may be a direction perpendicular to the second direction DR2 that is the extension direction of the folding axis FX1. The display device ED including at least one of a window WM and a support plate MP including a plurality of sub film layers stacked in the first direction DR1 may exhibit substantially excellent folding characteristics and substantially good mechanical properties. The window WM and the support plate MP in an embodiment including a plurality of sub film layers will be described later in more detail.

Referring to FIGS. 3 and 4, in an embodiment, the upper module UM may include a window WM, a protective film PL disposed above the window WM, and an optical layer RCL disposed below the window WM. In an embodiment, the protective film PL or the optical layer RCL of the upper module UM may be omitted.

The window WM may include a window folding part FA-WM and window non-folding parts NFA1-WM and NFA2-WM. In the specification, the window folding part FA-WM may be also referred to as a folding part, and the window non-folding parts NFA1-WM and NFA2-WM may be also referred to as non-folding parts. The first non-folding part NFA1-WM and the second non-folding part NFA2-WM of the window WM may be spaced apart from each other with the folding part FA-WM therebetween. The folding part FA-WM may be a part corresponding to the folding area FA1 (refer to FIG. 1A), and the non-folding parts NFA1-WM and NFA2-WM may be parts corresponding to the non-folding areas NFA1 and NFA2 (refer to FIG. 1A).

In the display device ED in an embodiment, the window WM may cover an entirety of the outside of the display module DM. The window WM may have a shape corresponding to the shape of the display module DM.

Also, the display device ED in an embodiment may include a housing HAU that accommodates the display module DM, the lower module LM, or the like. The housing HAU may be coupled to the window WM. Although not shown, the housing HAU may further include a hinge structure for easy folding or bending.

In an embodiment, the protective film PL may be disposed above the window WM to protect the window WM from an external environment. A protective layer adhesive layer AP-PL may be further disposed between the window WM and the protective film PL. The protective layer adhesive layer AP-PL may be an optically clear adhesive layer. When the display device ED in an embodiment includes the protective film PL, the protective film PL may be a layer exposed to the outside of the display device ED.

The protective film PL may have an optical characteristic having a transmittance of about 90% or more in the visible light region and a haze value of less than about 1%. The protective film PL may include a polymer film such as a cyclo-olefin polymer ("COP") film, a polyether sulfone ("PES") film, or a polyethylene terephthalate ("PET") film. In addition, the protective film PL may have a polymer film as a base layer and further include a functional layer such as a hard coating layer, an anti-fingerprint coating layer, an antistatic coating layer, or the like on the base layer. The protective film PL used in the display device ED in an embodiment may have flexibility.

In an embodiment, the optical layer RCL may be disposed on the display module DM. The optical layer RCL may function to reduce reflection by external light. In an embodiment, the optical layer RCL may include a polarizing layer or a color filter layer, for example. In an embodiment, the optical layer RCL may be directly disposed on the display module DM. However, the disclosure is not limited thereto, and a separate adhesive member may be further disposed between the display module DM and the optical layer RCL.

Although not shown in the drawing, the display device ED in an embodiment may further include a damping layer on the upper module UM. The damping layer may be disposed between the display module DM and the window WM.

The display device ED in an embodiment may include a window adhesive layer AP-W disposed between the optical layer RCL and the window WM. When the optical layer RCL is omitted in the display device ED in an embodiment, the window adhesive layer AP-W may be disposed between the display module DM and the window WM. The window adhesive layer AP-W may be an optically clear adhesive film ("OCA") or an optically clear adhesive resin layer ("OCR"). In an embodiment, the window adhesive layer AP-W may be omitted.

In the display device ED in an embodiment, the display module DM may display an image according to an electrical signal and may transmit/receive information about an external input. The display module DM may be defined as a display area DP-DA and a non-display area DP-NDA. The display area DP-DA may be defined as an area for emitting an image provided by the display module DM.

The non-display area DP-NDA is adjacent to the display area DP-DA. In an embodiment, the non-display area DP-NDA may surround the display area DP-DA, for example. However, this is illustrated by way of example, and the non-display area DP-NDA may be defined in various shapes and is not limited to any particular embodiment. In an embodiment, the display area DP-DA of the display module DM may correspond to at least a portion of the first active area F-AA (refer to FIG. 1A).

The display module DM may include a display panel DP and an input sensor IS disposed on the display panel DP. The display panel DP may include a display element layer. In an embodiment, the display element layer may include an organic electroluminescent element, a quantum dot light-emitting element, or a liquid crystal element layer, for example. However, the disclosure is not limited thereto.

In the display device ED in an embodiment, the input sensor IS may include a plurality of sensing electrodes for sensing an external input. The input sensor IS may be a capacitive sensor, but is not particularly limited. The input sensor IS may be directly formed on the display panel DP through a continuous process when the display panel DP is manufactured. However, the disclosure is not limited thereto, and the input sensor IS may be manufactured as a separate panel from the display panel DP and attached to the display panel DP by an adhesive layer (not shown).

In the display device ED in an embodiment, the display module DM may include a folding display part FA-D and non-folding display part NFA1-D and NFA2-D. The folding display part FA-D may be a part corresponding to the folding area FA1 (refer to FIG. 1A), and the non-folding display parts NFA1-D and NFA2-D may be parts corresponding to the non-folding areas NFA1 and NFA2 (refer to FIG. 1A).

The folding display part FA-D may correspond to a part that is folded or bent based on the first folding axis FX1. The display module DM includes a first non-folding display part NFA1-D and a second non-folding display part NFA2-D, and the first non-folding display part NFA1-D and the second non-folding display part NFA2-D may be spaced apart from each other with the folding display part FA-D therebetween.

In the display device ED in an embodiment, the lower module LM may include the support plate MP. Also, in an embodiment, the lower module LM may further include at least one of a support module SM, a protective layer PF, and a buffer layer CPN. In an embodiment, the display device ED may include a support plate MP disposed below the display module DM, a protective layer PF and a buffer layer CPN disposed between the support plate MP and the display module DM, and a support module SM disposed below the support plate MP, for example.

In an embodiment, the support plate MP may be disposed below the display module DM. The support plate MP may include a folding support part FA-MP and non-folding support parts NFA1-MP and NFA2-MP. In the specification, the folding support part FA-MP may be also referred to as a folding part, and the non-folding support parts NFA1-MP and NFA2-MP may be also referred to as non-folding parts. The first non-folding part NFA1-MP and the second non-folding part NFA2-MP of the support plate MP may be spaced apart from each other with the folding part FA-MP therebetween. The folding part FA-MP may be a part corresponding to the folding area FA1 (refer to FIG. 1A), and the non-folding parts NFA1-MP and NFA2-MP may be parts corresponding to the non-folding areas NFA1 and NFA2 (refer to FIG. 1A).

Referring to FIGS. 3 and 4, a protective layer PF may be disposed between the display module DM and the support plate MP. The protective layer PF may be a layer disposed under the display module DM to protect the rear surface of the display module DM. The protective layer PF may overlap the entire display module DM. The protective layer PF may include a polymer material. In an embodiment, the protective layer PF may be a polyimide film or a polyethylene terephthalate film, for example. However, this is merely one of embodiments and the material of the protective layer PF is not limited thereto.

The display device ED in an embodiment may include the support module SM. The support module SM may include a support part SPM and a filling part SAP. The support part SPM may be a part overlapping most of the display module DM. The filling part SAP may be a part disposed outside the support part SPM and overlapping the outside of the display module DM.

The support module SM may include support layers SP1 and SP2. The support layers SP1 and SP2 may include a first sub support layer SP1 and a second sub support layer SP2 spaced apart from each other in the direction of the second direction axis DR2. The first sub support layer SP1 and the second sub support layer SP2 may be spaced apart from each other at a portion corresponding to the first folding axis FX1. The support layers SP1 and SP2 are spaced apart from each other in the folding area FA1 to serve as the first sub support layer SP1 and the second sub support layer SP2, thereby improving folding or bending characteristics of the display device ED. Although not shown in the drawing, the support layers SP1 and SP2 may include a cushion layer (not shown) and a lower support plate (not shown) stacked in the thickness direction.

The lower support plate (not shown) may include a metal material or a polymer material. In an embodiment, the lower support plate may include stainless steel, aluminum, copper, or any alloys thereof.

The cushion layer (not shown) may prevent pressing and deformation of the support plate MP due to external impact and force. The cushion layer (not shown) may include a sponge, foam, or an elastomer such as a urethane resin. In addition, the cushion layer (not shown) may be formed including at least one of an acrylic polymer, a urethane polymer, a silicone polymer, and an imide polymer. However, the disclosure is not limited thereto. The cushion layer (not shown) may be disposed below the support plate MP or below the lower support plate (not shown).

In addition, the support module SM may further include at least one of a shielding layer EMP and an inter-bonding layer ILP. The shielding layer EMP may be an electromagnetic wave shielding layer or a heat dissipation layer. In addition, the shielding layer EMP may function as a bonding layer. A shielding layer EMP may be used to couple the support module SM and the housing HAU.

The support module SM may further include an inter-bonding layer ILP disposed on the support layers SP1 and SP2. The inter-bonding layer ILP may bond the support plate MP and the support module SM. The inter-bonding layer ILP may be provided in the form of a bonding resin layer or an adhesive tape. In an embodiment, the inter-bonding layer ILP may include a portion overlapping the folding display part FA-D removed, for example. However, the disclosure is not limited thereto, and the inter-bonding layer ILP may overlap an entirety of the folding display part FA-D.

The filling part SAP may be disposed outside the support layers SP1 and SP2. The filling part SAP may be disposed between the support plate MP and the housing HAU. The filling part SAP may fill a space between the support plate MP and the housing HAU, and fix the support plate MP.

Referring to FIGS. 3 and 4, the display device ED in an embodiment may include a buffer layer CPN in the lower module LM. The buffer layer CPN may serve as a thickness compensation layer compensating for the thickness under the display module DM or a support layer supporting the display module DM. Unlike illustrated, in an embodiment, the buffer layer CPN may be omitted.

A combination of components included in the lower module LM in the display device ED in an embodiment may vary depending on the size and shape of the display device ED, or operating characteristics of the display device ED.

Also, the display device ED in an embodiment may further include at least one of adhesive layers AP1 and AP2. In an embodiment, the first adhesive layer AP1 may be disposed between the display module DM and the protective layer PF, and the second adhesive layer AP2 may be disposed between the protective layer PF and the buffer layer CPN, for example. The at least one adhesive layer AP1 or AP2 may be an optically clear adhesive film ("OCA") or an optically clear adhesive resin layer ("OCR"). However, the disclosure is not limited thereto, and at least one of the adhesive layers AP1 and AP2 may be an adhesive layer having a transmittance of about 80% or less. Although not shown in the drawing, the display device ED in an embodiment may further include an adhesive layer disposed between the buffer layer CPN and the support plate MP.

Although FIG. 3 illustrates a case in which the folding axis FX1 is parallel to the long side of the display device ED, the disclosure is not limited thereto, and in the display device in an embodiment, the folding axis may be parallel to the short side of the display device.

Figure 5:
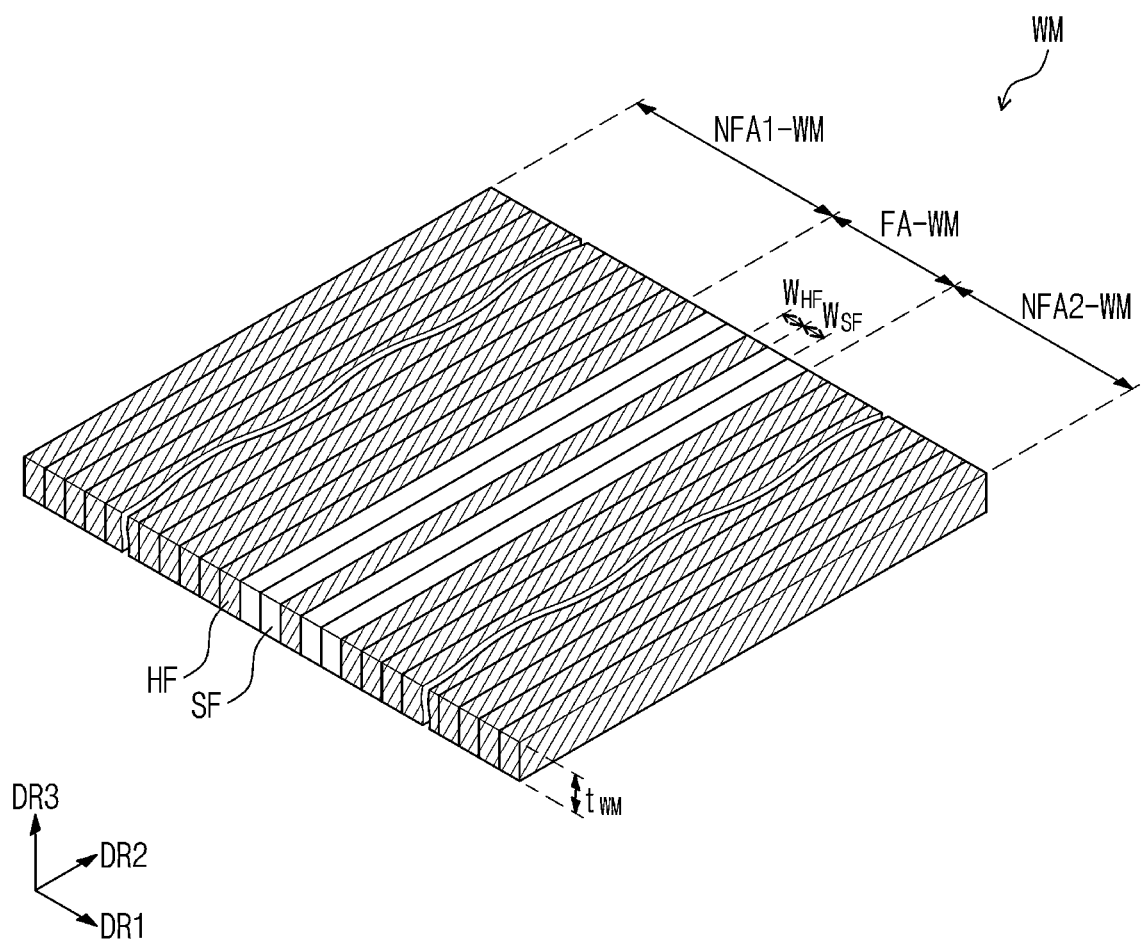
FIG. 5 is a perspective view of an embodiment of a window.
Figure 6:
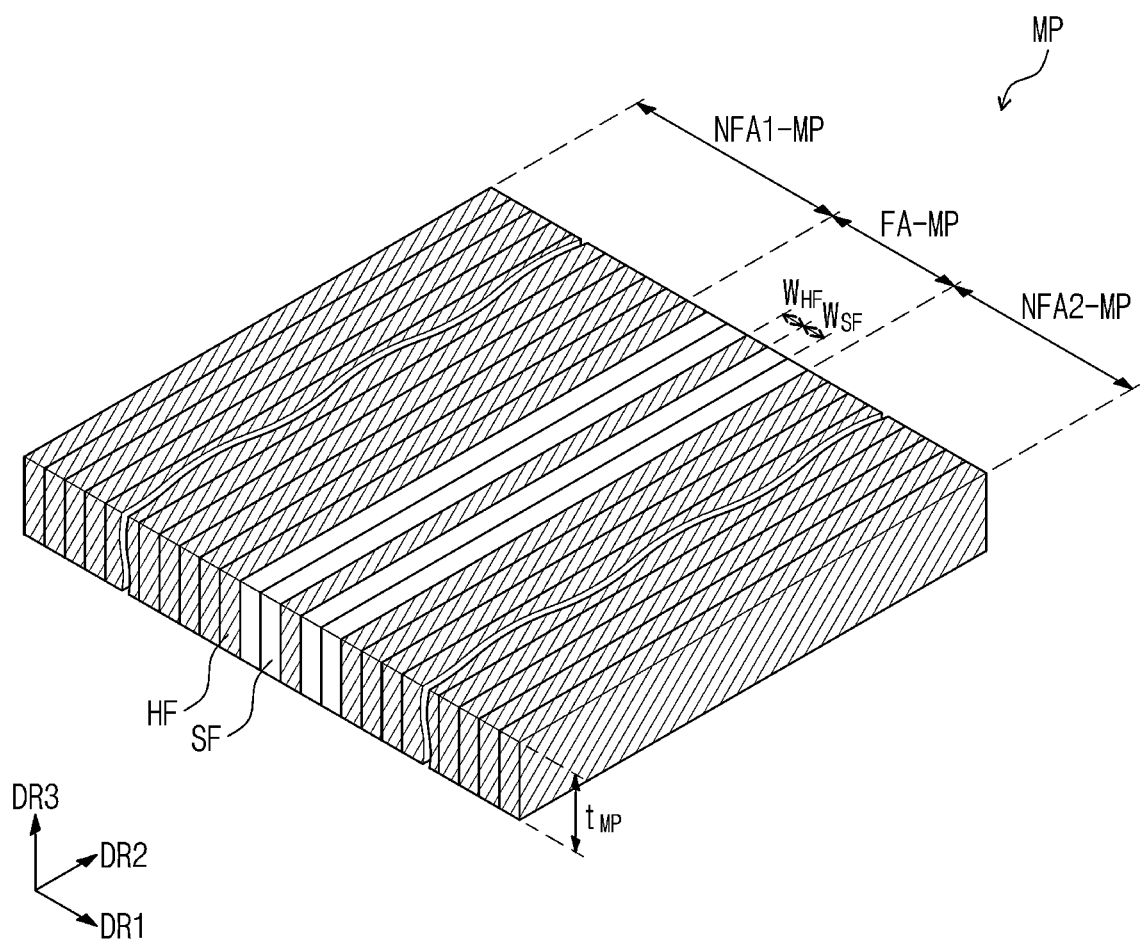
FIG. 6 is a perspective view of an embodiment of a support plate.

FIG. 5 is a perspective view illustrating an embodiment of a window, and FIG. 6 is a perspective view illustrating an embodiment of a support plate.

Referring to FIG. 5, the window WM in an embodiment may include a plurality of sub film layers SF and HF sequentially stacked in a first direction DR1. Each of the plurality of sub film layers SF and HF included in the window WM in the embodiment shown in FIG. 5 has a thickness in the first direction DR1, and a surface in contact with the adjacent sub film layer may be parallel to a plane defined by the second direction axis DR2 and the third direction axis DR3. That is, in an embodiment, the interface between the sub film layers SF and HF may be perpendicular to the lower surface or upper surface of the window WM. However, the disclosure is not limited thereto, and the interface between the sub film layers SF and HF may be provided such that the sub film layers SF and HF have an inclination with respect to the lower or upper surface of the window WM.

A separate adhesive member may not be included between the plurality of sub film layers SF and HF in the window WM. The adjacent sub film layers SF and HF may be coupled to each other by self-adhesion without a separate adhesive member. The adjacent sub film layers SF and HF may be self-adhesive and fixed to each other by heat provided in the process of stacking and processing the sub film layers. However, the disclosure is not limited thereto.

The window WM of an embodiment may include a plurality of first sub film layers SF in a folding part FA-WM and a plurality of second sub film layers HF in non-folding parts NFA1-WM and NFA2-WM. In addition, the window WM in an embodiment may include a plurality of first sub film layers SF and at least one second sub film layers HF in a folding part FA-WM. In an embodiment, the non-folding parts NFA1-WM and NFA2-WM of the window WM may not include the first sub film layers SF. However, the disclosure is not limited thereto.

The first sub film layer SF and the second sub film layer HF may have different storage modulus. The storage modulus of the second sub film layer HF may be greater than the storage modulus of the first sub film layer SF. According to the difference of the relative storage modulus of the first sub film layer SF and the second sub film layer HF, the first sub film layer SF is a relatively soft film layer, and the second sub film layer HF may correspond to a relatively hard film layer.

A storage modulus of each of the first sub film layers SF may be about 1 megapascal (MPa) or less, and a storage modulus of each of the second sub film layers HF may be about 3 MPa or more. By including the first sub film layers SF having a low storage modulus of about 1 MPa or less in the folding part FA-WM, the window WM may exhibit substantially excellent folding characteristics without buckling. In addition, by including the second sub film layers HF having a storage modulus of about 3 MPa or more in the non-folding parts NFA1-WM and NFA2-WM, the window WM may exhibit substantially excellent mechanical properties with improved impact resistance.

In an embodiment, a difference in refractive index between the first sub film layer SF and the second sub film layer HF included in the window WM in the visible light region may be about 0.02 or less. In this case, the difference in refractive index between the first sub film layer SF and the second sub film layer HF corresponds to a difference in refractive index values at the same wavelength. As the refractive index difference between the first sub film layer SF and the second sub film layer HF is controlled to about 0.02 or less, even when the plurality of sub film layers SF and HF is stacked, deformation of the optical path at the interface between the sub film layers SF and HF may be minimized. Accordingly, the window WM including the plurality of stacked sub film layers SF and HF may exhibit substantially good optical properties, and the display device in an embodiment may exhibit substantially excellent display quality.

The first sub film layer SF may be a film layer including at least one of silicone, acrylic, thermoplastic polyurethane ("TPU"), and ethylene vinyl acetate ("EVA"). In addition, the second sub film layer HF may include at least one of silicone, acrylic, polyethyleneterephthalate ("PET"), polyethylene naphthalate ("PEN"), polyethersulfone ("PES"), and polyimide ("PI"). However, the disclosure is not limited thereto, and the material of the first sub film layer SF and the second sub film layer HF may be selected from various polymer materials within a range satisfying the above-described elastic modulus and optical properties.

A thickness $W_{SF}$ of the first sub film layer SF and a thickness $W_{HF}$ of the second sub film layer HF included in the window WM in an embodiment may each independently be about 100 micrometers (μm) or more and about 200 μm or less. In an embodiment, the thickness $W_{SF}$ of the first sub film layer SF and the thickness $W_{HF}$ of the second sub film layer HF correspond to the thickness in a direction perpendicular to the interface between the sub film layers, respectively. That is, in an embodiment, the thickness $W_{SF}$ of the first sub film layer SF and the thickness $W_{HF}$ of the second sub film layer HF may be the thicknesses in the normal direction to the interface between the sub film layers, respectively. The thickness $W_{SF}$ of the first sub film layer SF and the thickness $W_{HF}$ of the second sub film layer HF are each independently provided to be about 100 μm or more and about 200 μm or less, so that the window WM provided by stacking sub film layers SF and HF may exhibit substantially excellent folding characteristics, and deterioration of optical properties of the window WM according to the stacking of sub film layers within a corresponding thickness range may be minimized.

In an embodiment, both the thickness $W_{SF}$ of the plurality of first sub film layers SF and the thickness $W_{HF}$ of the plurality of second sub film layers HF may be the same. Also, unlike this, a thickness of at least one of the plurality of first sub film layers SF and the plurality of second sub film layers HF may be different from the thickness of the other sub film layers.

Referring to FIG. 5, although it is shown that the window WM in an embodiment includes four first sub film layers SF and two second sub film layers HF in a folding part FA-WM, this is merely one of embodiments, and a ratio of the first sub film layers SF and the second sub film layers HF included in the folding part FA-WM may be changed according to the type of material of the first sub film layer SF and the second sub film layer HF used, and folding characteristics desired in the display device.

In an embodiment, the thickness $t_{WM}$ of the window WM may be about 50 μm or more and about 300 μm or less. The thickness $t_{WM}$ of the window WM corresponds to a thickness in the third direction DR3 that is a direction in which the display module DM (refer to FIG. 4) and the upper module UM of the display device are stacked.

In an embodiment, the thickness of the folding part FA-WM and the non-folding parts NFA1-WM and NFA2-WM of the window WM may be substantially the same. As the thickness of the folding part FA-WM and the non-folding parts NFA1-WM and NFA2-WM is provided substantially the same, compared to a conventional window in which a step or a lattice pattern is provided to a folding part to improve folding characteristics, visibility of a step according to a thickness difference may be improved.

Referring to FIG. 6, the support plate MP in an embodiment may include a plurality of sub film layers SF and HF sequentially stacked in the first direction DR1. Each of the plurality of sub film layers SF and HF included in the support plate MP in the embodiment shown in FIG. 6 has a thickness in the first direction DR1, and a surface in contact with the adjacent sub film layer may be parallel to a plane defined by the second direction axis DR2 and the third direction axis DR3. That is, in an embodiment, the interface between the sub film layers SF and HF may be perpendicular to the lower surface or upper surface of the support plate MP. However, the disclosure is not limited thereto, and the interface between the sub film layers SF and HF may be provided such that the sub film layers SF and HF have an inclination with respect to the lower or upper surface of the support plate MP.

Description of the sub film layers SF and HF included in the window WM according to the above-described embodiment may be identically applied to the sub film layers SF and HF included in the support plate MP in an embodiment. However, a combination of the materials of the first sub film layer SF and the second sub film layer HF constituting the window WM may be different from a combination of materials of the first sub film layer SF and the second sub film layer HF constituting the support plate MP. In an embodiment, the first sub film layer SF included in the support plate MP may be a film layer including at least one of silicone, acrylic, thermoplastic TPU, and EVA, and may be the same as or different from the material of the first sub film layer SF of the window WM, for example. In addition, the second sub film layer HF included in the support plate MP may include at least one of silicone, acrylic, PET, PEN, PES, and PI, and may be the same as or different from the material of the second sub film layer HF of the window WM.

The support plate MP of an embodiment may include a plurality of first sub film layers SF in a folding part FA-MP, and a plurality of second sub film layers HF in non-folding parts NFA1-MP and NFA2-MP. In addition, the support plate MP in an embodiment may include a plurality of first sub film layers SF and at least one second sub film layer HF in a folding part FA-MP. In an embodiment, the non-folding parts NFA1-MP and NFA2-MP of the support plate MP may not include the first sub film layers SF. However, the disclosure is not limited thereto.

In FIG. 6, like the window WM in the embodiment shown in FIG. 5, although the support plate MP in an embodiment is illustrated as including four first sub film layers SF and two second sub film layers HF in the folding part FA-MP, this as an exemplary, and the ratio of the first sub film layers SF and the second sub film layers HF included in the folding part FA-MP may be different from the ratio in the folding part FA-WM of the window WM. A ratio of the first sub film layers SF and the second sub film layers HF included in the folding part FA-MP of the support plate MP may be changed depending on the type of material of the first sub film layer SF and the second sub film layer HF used, and folding characteristics desired in the display device.

Also, the thicknesses of the first sub film layers SF and the second sub film layers HF included in the support plate MP may be independently about 100 μm or more and about 200

μm or less as described with reference to FIG. 5. The thickness of the first sub film layer SF and the thickness of the second sub film layer HF are each independently provided to be about 100 μm or more and about 200 μm or less so that the support plate MP provided by laminating the first sub film layer SF and the second sub film layer HF may exhibit substantially excellent folding characteristics and substantially good strength characteristics.

In an embodiment, the thickness $t_{MP}$ of the support plate MP may be about 50 μm or more and about 300 μm or less. The thickness $t_{MP}$ of the support plate MP may be a length measured in the third direction DR3. The thickness in the folding part FA-MP and the non-folding parts NFA1-MP and NFA2-MP of the support plate MP may be substantially the same. As the thickness of the folding part FA-MP and the non-folding parts NFA1-MP and NFA2-MP is provided substantially the same, compared to the conventional support plate that defines an opening in or provides a lattice pattern to the folding part to improve folding characteristics, visibility of the step difference according to the thickness difference in the folding part may be improved.

The display device ED in the embodiment illustrated in FIGS. 3 and 4 may include a structure in which sub film layers are stacked on at least one of the window WM and the support plate MP. That is, in an embodiment, the display device includes the window WM in the embodiment shown in FIG. 5 and the support plate may have the structure of a conventional support plate in the form of an opening defined in the folding part, and in another embodiment, the display device may include the support plate MP in the embodiment shown in FIG. 6, and the window may have a conventional window structure including glass or a polymer material. Also, in an embodiment, the display device may include both the window WM in the embodiment shown in FIG. 5 and the support plate MP in the embodiment shown in FIG. 6.

When the display device ED in an embodiment includes a structure of a conventional support plate, the support plate may include a metal material or a polymer material. In an embodiment, the support plate may include stainless steel, aluminum, copper, or any alloys thereof, for example. In an alternative embodiment, the support plate may be formed from a polymer material. A plurality of openings may be defined in the support plate corresponding to the folding area FA1 (refer to FIG. 1A).

When the display device ED in an embodiment includes a conventional window configuration, the window may include an optically transparent insulating material. The window may include a glass substrate or a polymer film as a base layer. In an embodiment, the window may include single organic substrate or single polymer film layer, for example.

Figure 7A:
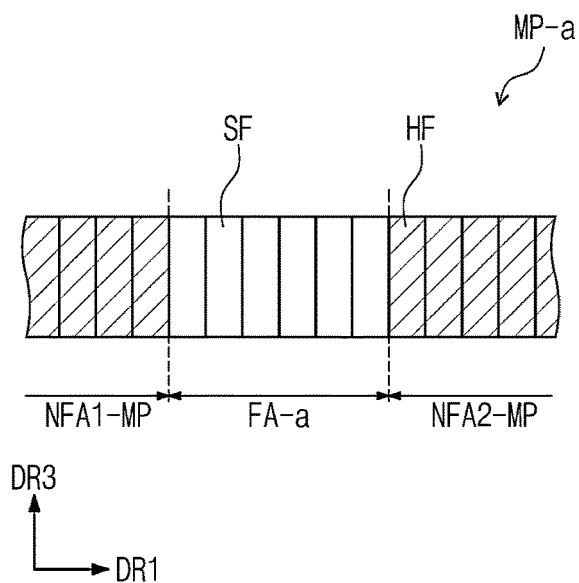
FIG. 7A is a cross-sectional view of an embodiment of a support plate.
Figure 7B:
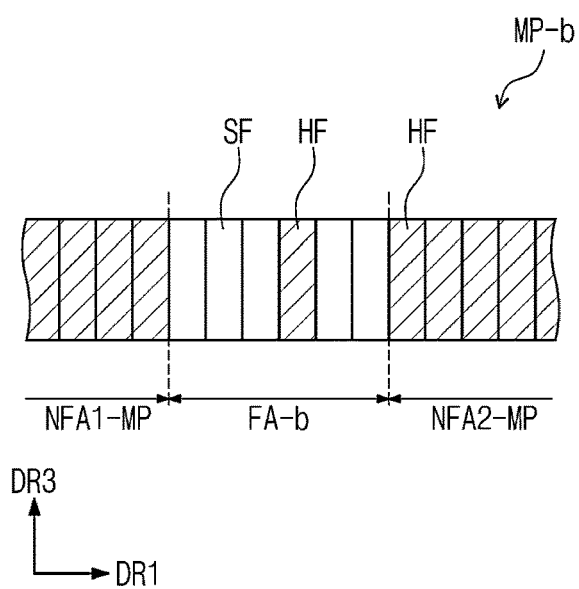
FIG. 7B is a cross-sectional view of an embodiment of a support plate.

FIGS. 7A and 7B are cross-sectional views illustrating an embodiment of a portion of a support plate, respectively. Although FIGS. 7A and 7B respectively show an embodiment of the support plates MP-a and MP-b, the configuration of the folding parts FA-a and FA-b shown in FIGS. 7A and 7B may be equally applied to the folding part of the window WM (refer to FIG. 5) in an embodiment.

Referring to FIG. 7A, the folding part FA-a may include a plurality of first sub film layers SF and may not include a second sub film layer HF. That is, in an embodiment, the support plate MP-a may include only the first sub film layers SF, which are soft film layers, in the folding part FA-a, and may include only the second sub film layers HF, which are hard film layers, in the non-folding parts NFA1-MP and NFA2-MP. Also, similar to this structure, the window WM (refer to FIG. 5) in an embodiment may include only the first sub film layers SF in the folding part FA-WM.

Referring to FIG. 7B, the folding part FA-b may include a plurality of first sub film layers SF and one second sub film layer HF. That is, compared with the support plate MP in the embodiment shown in FIG. 6, in an embodiment, the support plate MP-b may include a relatively small ratio of the hard film layer in the folding part FA-b. However, this is merely one of embodiments, and the folding part FA-b may include a plurality of second sub film layers HF, and for example, a ratio of the number of stacked first sub film layers SF and second sub film layers HF in the folding part FA-b may be a ratio of 1:0 to 1:1. In addition, the ratio of the number of stacks of the first sub film layers SF and the second sub film layers HF in this folding part FA-b may be equally applied to the window WM (refer to FIG. 5).

Figure 8:
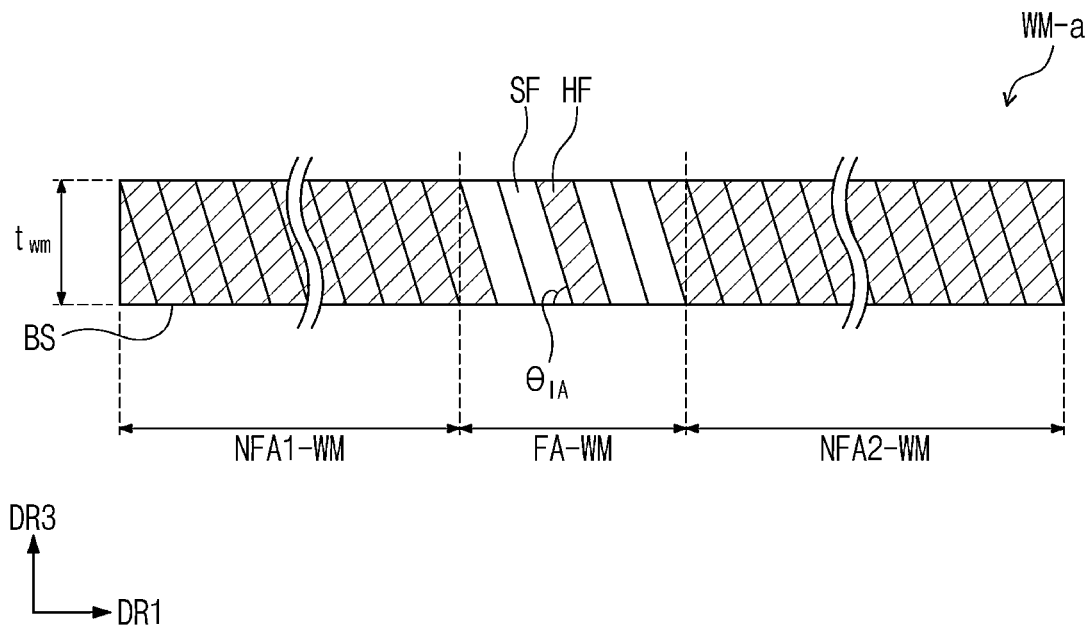
FIG. 8 is a cross-sectional view of an embodiment of a window.

FIG. 8 is a cross-sectional view illustrating an embodiment of a window. Referring to FIG. 8, the window WM-a in an embodiment includes a plurality of sub film layers SF and HF stacked in one direction, and one surface of the sub film layers SF and HF serving as an interface between neighboring sub film layers may be inclined with respect to the lower surface or upper surface of the window WM-a.

In FIG. 8, the inclination angle $\Theta_{IA}$ formed by the interface between the sub film layers SF and HF with respect to the lower surface BS of the window WM-a is indicated, and the inclination angle $\Theta_{IA}$ of the interface between the sub film layers SF and HF may be greater than about 0° and less than about 180°. That is, the interface between the sub film layers SF and HF included in the window WM-a may be perpendicular to or inclined with respect to the upper surface of the display module DM (refer to FIG. 4). The interface between the sub film layers SF and HF may not be parallel to the upper surface of the display module DM (refer to FIG. 4).

In FIG. 8, the window WM-a in an embodiment has been illustrated and described, but the same description may be applied to sub film layers included in the support plate MP (refer to FIG. 6). That is, the inclination angle defined by the interface between the sub film layers included in the support plate MP (refer to FIG. 6) with respect to the lower surface of the support plate MP (refer to FIG. 6) in an embodiment may be greater than about 0° and smaller than about 180°. That is, the interface between the sub film layers SF and HF included in the support plate MP (refer to FIG. 6) may be perpendicular or inclined with respect to the lower surface of the display module DM (refer to FIG. 4).

Figure 9A:
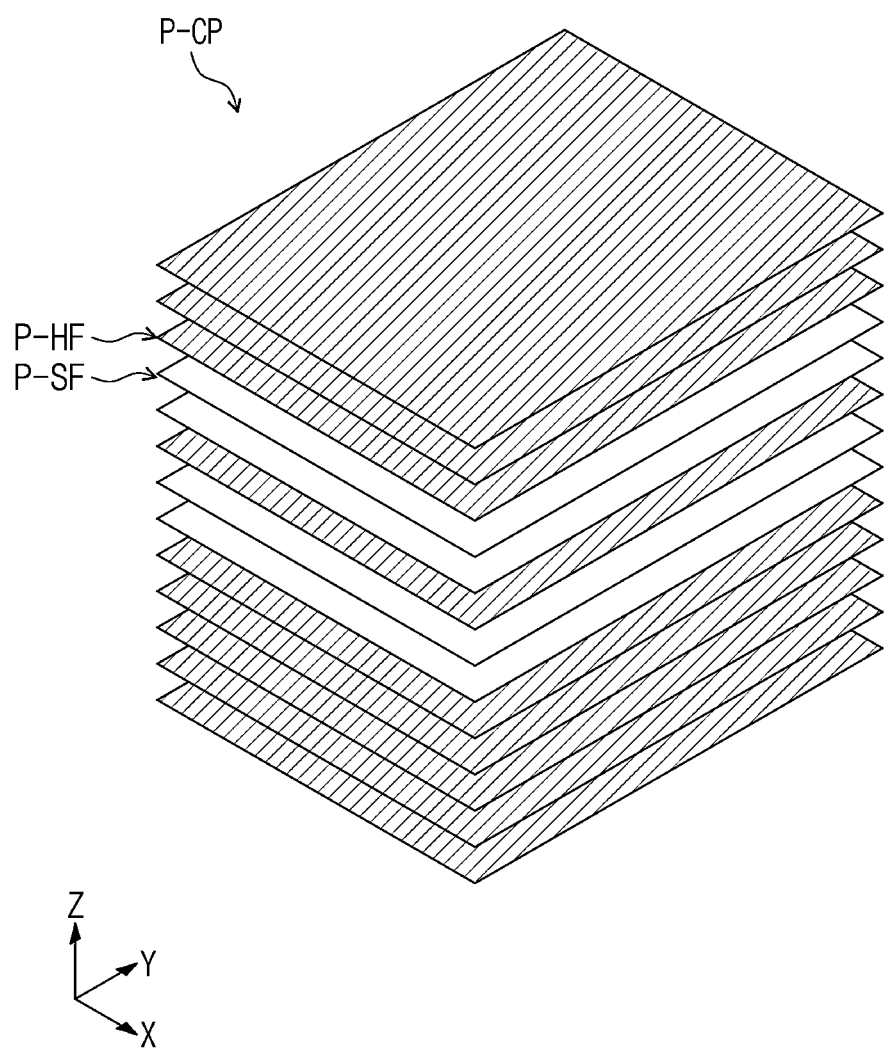
FIG. 9A is a view showing an embodiment of a part of the manufacturing step of the composite film layer.
Figure 9B:
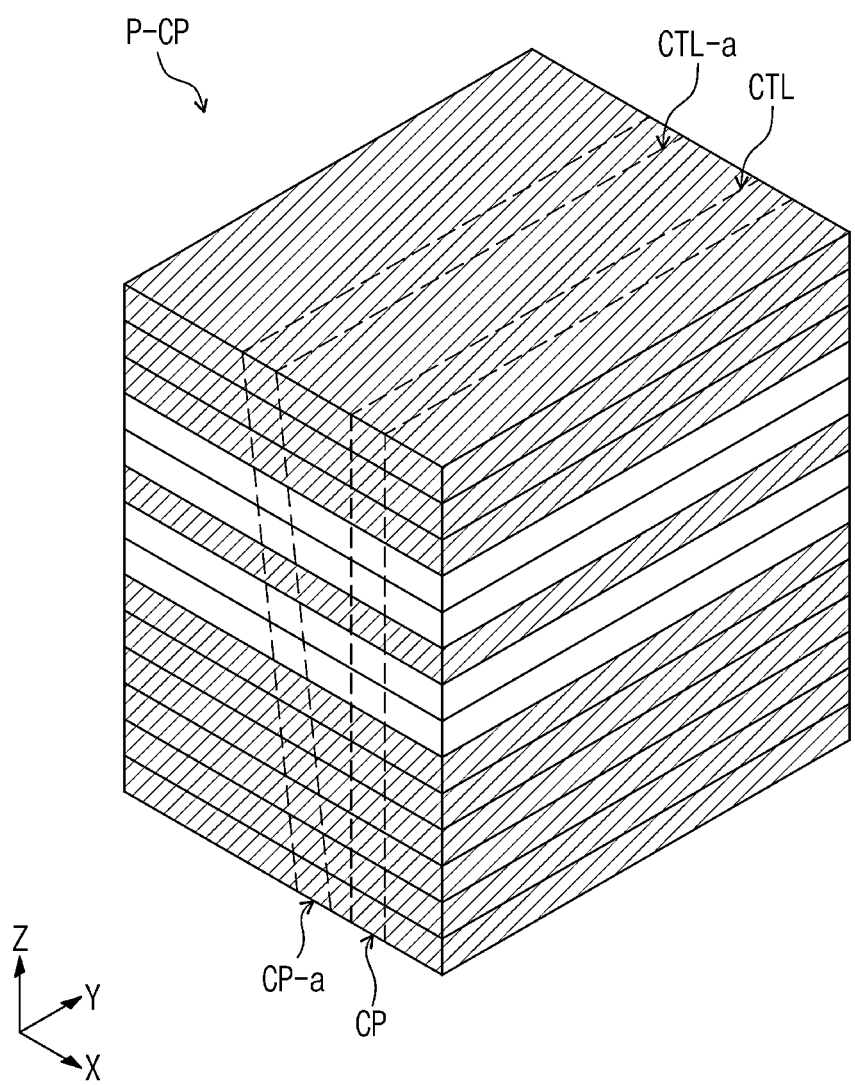
FIG. 9B is a view showing an embodiment of a part of the manufacturing step of the composite film layer.

FIGS. 9A and 9B are diagrams illustrating an embodiment of a part of the step of manufacturing a composite film layer, respectively. In relation to the X-axis X, the Y-axis Y, and the Z-axis Z disclosed in FIGS. 9A and 9B, the extension direction of the X-axis X and the extension direction of the Y-axis Y are orthogonal to each other in a relative direction, and the extension direction of the Z-axis Z may be a direction normal to a plane defined by the X-axis and the Y-axis. In the specification, the direction of the Z-axis Z corresponds to a direction parallel to the first direction DR1 in the embodiment described with reference to FIGS. 1A to 8.

Referring to FIG. 9A, the preliminary composite film layer P-CP may be provided by stacking a plurality of preliminary sub film layers P-HF and P-SF in the direction of the Z-axis Z. The preliminary composite film layer P-CP may include a plurality of preliminary first sub film layers P-SF and a plurality of preliminary second sub film layers P-HF. The preliminary first sub film layers P-SF and the preliminary second sub film layers P-HF may be provided by being laminated in an appropriately combined order according to the physical properties desired in the composite film layers CP and CP-a. In an embodiment, a plurality of preliminary first sub film layers P-SF may correspond to the folding areas FA1 and FIG. 4, and a plurality of preliminary second sub film layers P-HF may correspond to the non-folding areas NFA1 and NFA2 of FIG. 4, for example. In addition, in an embodiment, preliminary second sub film layers P-HF may further correspond to the folding area FA1 (refer to FIG. 4).

Referring to FIG. 9B, by cutting the preliminary composite film layer P-CP along the cutting lines CTL and CTL-a may form composite film layers CP and CP-a. The composite film layer CP may be formed along the first cutting line CTL perpendicular to the plane defined by the X-axis X and the Y-axis Y, or the composite film layer CP-a may be formed along the second cutting line CTL-a having an inclination with respect to a plane defined by the X-axis X and the Y-axis Y. In an embodiment, the composite film layer CP formed along the first cutting line CTL may correspond to the window WM shown in FIG. 5 or the support plate MP shown in FIG. 6, for example. The composite film layer CP-a formed along the second cutting line CTL-a may correspond to the window WM-a shown in FIG. 8 or the support plate including a plurality of sub film layers (not shown) arranged to be inclined like the window WM-a shown in FIG. 8.

The configuration of the windows WM and WM-a and the support plates MP, MP-a, and MP-b) in an embodiment described with reference to FIGS. 3 to 8 may be equally applied to the display device ED-a in the embodiment illustrated in FIGS. 2A and 2B.

The display device in an embodiment includes at least one composite film layer on the upper or lower portion of the display module, and the composite film layer includes a soft film layer and a hard film layer arranged to be perpendicular or inclined to the upper or lower surface of the display module, so that it is possible to exhibit substantially excellent folding characteristics and substantially excellent durability. In addition, the composite film layer included in the display device of an embodiment is manufactured through a process of cutting after lamination of the soft film layer and the hard film layer, and accordingly, the thickness deviation in the entire composite film layer is small, so that the display device may exhibit improved characteristics in which the step recognition due to thickness deviation is improved.

The display device in an embodiment includes a plurality of flexible film layers aligned in one direction on at least one folding part of a window and a support plate, and includes a plurality of hard film layers aligned in one direction on the non-folding part such that it is possible to simultaneously exhibit substantially excellent impact resistance and substantially excellent folding reliability without increasing the stiffness of the window or the support plate.

The display device in an embodiment may include a composite film layer including a plurality of sub film layers stacked in a direction inclined with respect to a thickness direction to exhibit substantially good folding characteristics and substantially excellent mechanical properties.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. A display device including a folding area and a non-folding area divided into a first non-folding area and a second non-folding area spaced apart in a first direction with the folding area therebetween, the display device comprising:
   a display module;
   a window on a first surface of the display module; and
   a support plate on a second surface of the display module which is opposite to the first surface of the display module, at least one of the window and the support plate comprising:
      a folding part corresponding to the folding area and including first sub film layers stacked in the first direction; and
      a non-folding part corresponding to the non-folding area and including second sub film layers stacked in the first direction,
   wherein a second sub film layer of the second sub film layers has a storage modulus larger than a storage modulus of a first sub film layer of the first sub film layers.

2. The display device of claim 1, wherein the folding part further comprises at least one second sub film layer stacked in the first direction adjacent to the first sub film layers.

3. The display device of claim 1, wherein the storage modulus of each of the first sub film layers is about 1 megapascal or less, and
   wherein the storage modulus of each of the second sub film layers is about 3 megapascals or more.

4. The display device of claim 1, wherein each of the first sub film layers comprises at least one of silicone, acrylic, thermoplastic polyurethane, and ethylene vinyl acetate.

5. The display device of claim 1, wherein each of the second sub film layers comprises at least one of silicone, acrylic, polyethylene terephthalate, polyethylene naphthalate, polyethersulfone, and polyimide.

6. The display device of claim 1, wherein a difference between a refractive index of the first sub film layer and a refractive index of the second sub film layer in a visible region is about 0.02 or less.

7. The display device of claim 1, wherein a thickness of the first sub film layers and the second sub film layers is each independently about 100 micrometers or more and about 200 micrometers or less, and
   wherein the thickness is a length in a direction perpendicular to an interface between neighboring sub film layers of the first sub film layers and the second sub film layers.

8. The display device of claim 1, wherein a thickness of the window and the support plate is each independently about 50 micrometers or more and about 300 micrometers or less.

9. The display device of claim 1, wherein an interface between the first sub film layers and an interface between the second sub film layers are perpendicular or inclined with respect to an upper surface or a lower surface of the display module.

10. A display device comprising:
    a display module;
    an upper module on a first surface of the display module; and
    a lower module on a second surface of the display module opposite to the first surface of the display module, at least one of the upper module and the lower module comprising:

a composite film layer including a plurality of sub film layers sequentially stacked in a first direction, wherein an interface between adjacent sub film layers of the plurality of sub film layers is perpendicular to or inclined with respect to the first surface or the second surface of the display module.

11. The display device of claim 10, wherein the plurality of sub film layers of the composite film layer comprises a plurality of first sub film layers and a plurality of second sub film layers, and wherein a second sub film layer of the plurality of second sub film layers has a storage modulus larger than a storage modulus of a first sub film layer of the plurality of first sub film layers.

12. The display device of claim 11, wherein the storage modulus of each of the plurality of first sub film layers is about 1 megapascal or less, and wherein the storage modulus of each of the plurality of second sub film layers is about 3 megapascals or more.

13. The display device of claim 11, wherein each of the plurality of first sub film layers comprises at least one of silicone, acrylic, thermoplastic polyurethane, and ethylene vinyl acetate, and wherein each of the plurality of second sub film layers comprises at least one of silicone, acrylic, polyethylene terephthalate, polyethylene naphthalate, polyethersulfone, and polyimide.

14. The display device of claim 11, wherein a difference between a refractive index of the first sub film layer and a refractive index of the second sub film layer in a visible region is about 0.02 or less.

15. The display device of claim 11, wherein the display module comprises a folding display part and a non-folding display part adjacent to the folding display part adjacent in the first direction, wherein the upper module comprises a window including a window folding part corresponding to the folding display part, and a window non-folding part corresponding to the non-folding display part, wherein the lower module comprises a support plate including a folding support part corresponding to the folding display part, and a non-folding support part corresponding to the non-folding display part, and wherein at least one of the window and the support plate is the composite film layer.

16. The display device of claim 15, wherein the window folding part comprises at least one of the plurality of first sub film layers stacked in the first direction, and wherein the window non-folding part comprises at least one of the plurality of second sub film layers stacked in the first direction.

17. The display device of claim 16, wherein the window folding part further comprises at least one of the plurality of second sub film layers, and wherein the window non-folding part does not comprise the first sub film layer.

18. The display device of claim 15, wherein the folding support part comprises at least one of the plurality of first sub film layers stacked in the first direction, and wherein the non-folding support part comprises at least one of the plurality of second sub film layers stacked in the first direction.

19. The display device of claim 18, wherein the folding support part further comprises at least one of the plurality of second sub film layers, and wherein the non-folding support part does not comprise the first sub film layer.

20. The display device of claim 10, wherein a thickness of the plurality of sub film layers is each independently about 100 micrometers or more and about 200 micrometers or less, and wherein the thickness is a length in a direction perpendicular to the interface between the adjacent sub film layers.

* * * * *